United States Patent
Ogawa et al.

(10) Patent No.: US 7,965,586 B2
(45) Date of Patent: Jun. 21, 2011

(54) MAGNETIZATION DETECTING METHOD AND APPARATUS

(75) Inventors: Susumu Ogawa, Fujimi (JP); Hiromasa Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 619 days.

(21) Appl. No.: 11/488,718

(22) Filed: Jul. 19, 2006

(65) Prior Publication Data

US 2007/0076533 A1    Apr. 5, 2007

(30) Foreign Application Priority Data

Oct. 3, 2005  (JP) ................................ 2005-290255

(51) Int. Cl.
*G11B 11/00*  (2006.01)
*G11B 9/00*  (2006.01)
(52) U.S. Cl. .................. 369/13.17; 369/13.22; 369/126
(58) Field of Classification Search ............... 369/13.17, 369/13.33, 110.01, 110.02, 110.03, 110.04, 369/13.22, 13.14, 13.02, 126, 112.16, 112.19, 369/112.23; 360/59, 69
See application file for complete search history.

(56) References Cited

U.S. PATENT DOCUMENTS

| | | | |
|---|---|---|---|
| 5,949,600 A | 9/1999 | Akiyama et al. | |
| 6,046,448 A | 4/2000 | Sato et al. | |
| 6,795,380 B2 | 9/2004 | Akiyama et al. | |
| 2004/0027929 A1* | 2/2004 | Fujimaki et al. | 369/13.33 |
| 2004/0218504 A1* | 11/2004 | Kim et al. | 369/112.16 |
| 2004/0228024 A1 | 11/2004 | Ogawa et al. | |
| 2005/0128886 A1* | 6/2005 | Ogawa et al. | 369/13.33 |

FOREIGN PATENT DOCUMENTS

| | | |
|---|---|---|
| JP | 05-250735 | 3/1992 |
| JP | 2005-108302 | 4/2005 |

OTHER PUBLICATIONS

N. Kroo et al., "Decay Length of Surface Plasmons Determined with a Tunnelling Microscope", Europhysics Letters, vol. 15, No. 3, Jun. 1991, pp. 289-293.

Office Action from the Japanese Patent Office in the corresponding Japanese Patent Application No. 2005-290255 (2 pages) dated Dec. 21, 2010.

* cited by examiner

*Primary Examiner* — Joseph Haley
*Assistant Examiner* — Nicholas Lee
(74) *Attorney, Agent, or Firm* — Stites & Harbison PLLC; Juan Carlos A. Marquez, Esq.

(57) ABSTRACT

A detection method and apparatus for reading magnetization information recorded in high density. A metal probe is brought close to the surface of a magnetic recording medium, in which information is recorded as magnetization, with the distance on the order of nanometers. The region is irradiated with an incident light as its polarization direction is modulated, and polarization dependency of a tunnel current or reflected polarization intensity is measured.

12 Claims, 15 Drawing Sheets

MAGNETIZATION DETECTING METHOD AND APPARATUS

CLAIM OF PRIORITY

The present application claims priority from Japanese application JP 2005-290255 filed on Oct. 3, 2005, the content of which is hereby incorporated by reference into this application.

BACKGROUND OF THE INVENTION

1. Field of the Invention

The present invention relates to a method and apparatus for reading magnetization information, and it relates to a novel magnetization detecting technology for reading magnetization information, utilizing change in the polarization state of incident light associated with change in the magnetization state of a recording film and a plasmon enhancement effect.

2. Background Art

With regard to the reading of magnetization information from a conventional hard disk drive (HDD) or a magneto-optical disk, a method for detecting magnetization information in a recording medium is used, by which a device involving the GMR (Giant Magneto-resistance) effect is utilized or change in the polarization state of incident light based on a magneto-optical effect is detected. Meanwhile, as recording units decrease due to the need for higher density, a device capable of detecting a smaller region in the recording medium is demanded. In a magneto-optical disk, while magnetization is detected by utilizing the change in the polarization state of light based on a magneto-optical effect, attempts to minimize the detection region are being made by utilizing, for example, a blue laser with a shorter wavelength or a near-filed effect with an optical probe. For example, Patent Document 1 discloses a technique for measuring magnetization in a recording medium based on a magneto-optical effect. According to the technique, polarized light modulated at a certain frequency is caused to enter an optical fiber probe, and the polarized light is caused to be emitted from a minute opening at the tip of the optical fiber probe so that a polarized light component transmitted through the recording medium is measured.

As a technique for obtaining atomic-level spatial resolution, a technique involving a scanning tunneling microscope (SAT) is known. As a technique for reading magnetization information utilizing a metal probe, for example, Patent Document 2 discloses a method for detecting the direction of magnetization in a ferromagnetic recording layer by utilizing the fact that a tunnel current that flows between a magnetic metal probe and a recording medium including a non-magnetic layer and the ferromagnetic recording layer varies, depending on whether the magnetic metal probe is parallel or anti-parallel to magnetization in the ferromagnetic recording layer. Patent Documents 3 and 4 disclose a method for detecting magnetization information based on a tunnel current by utilizing the fact that electronic states in a three-layer film structure including a ferromagnetic metal layer, a nonmagnetic metal layer, and another ferromagnetic metal layer vary depending on the direction of magnetization. Further, Patent Document 5 discloses a technique for optically detecting the state of light emission of a recording medium, which is excited by disposing a probe electrode opposite to the recording medium and applying a voltage thereto. Such magnetization detecting technologies involving a metal probe offer promising prospects for a technology for reproducing atomic-level information.

While not related to magnetization detecting technologies, it is known that a tunnel current increases when a metal surface in the close vicinity of a metal probe is irradiated with light. For example, Non-patent Document 1 discloses that a large direct current flows by irradiating the gap between a metal surface and a metal probe with light such that plasmon is excited. Patent Document 6 discloses that writing of magnetization can be facilitated by irradiating a metal plate having a gap with a laser light in order to concentrate an electric field in the gap between two metal plates, and by heating a medium disposed immediately below the gap of the metal plates.

Patent Document 1: JP Patent Publication (Kokai) No. 10-325840 A (1998)

Patent Document 2: JP Patent Publication (Kokai) No. 9-134551 A (1997)

Patent Document 3: JP Patent Publication (Kokai) No. 2004-342183 A

Patent Document 4: JP Patent Publication (Kokai) No. 2005-108302 A

Patent Document 5: JP Patent Publication (Kokai) No. 5-250735 A (1993)

Patent Document 6: JP Patent Publication (Kokai) No. 2002-298302 A

Non-patent Document 1: H. Q. Nguyen et al, IEEE Trans. Elec. Dev., 36, 2671 (1989)

SUMMARY OF THE INVENTION

With regard to conventional GMR devices, it is expected that minimizing the distance from a recording medium or a detection region will be difficult, since the film thickness of such a device cannot be minimized. In addition to the above problem, there is also a concern about whether a device utilizing the TMR (Tunneling Magneto-resistance) effect, which is expected to increase sensitivity, operates in ranges over GHz due to its large resistance by the use of the tunnel effect. It is difficult to obtain a spatial resolution of 100 nm or less by the method disclosed in Patent Document 1 because it utilizes a near-filed effect and the degree of polarization may deteriorate due to various birefringence factors. The methods disclosed in Patent Documents 2 to 4, which relate to STS (scanning tunneling spectroscopy) technology using a metal probe, are problematic in terms of noise because the change in tunnel current occurs depending on the change in the structure of a medium surface.

It is an object of the invention to provide a local magnetization detecting method for reducing noise that occurs due to the change in the structure of a medium surface.

In order to achieve the above object, in the invention, a metal probe is disposed opposite to a recording medium in a case where information is recorded in a magnetic recording layer of the recording medium through in-plane magnetization. In close proximity to the magnetic recording layer, there may be disposed an electrically conductive protection film, for example, an Au protection film, on the side of the metal probe. The metal probe is brought close to the recording medium and the gap between the recording medium and the metal probe is irradiated with polarized light such that the direction of magnetization and the incidence plane become parallel to each other. A tunnel current between the recording medium and the metal probe has polarization dependency depending on the direction of magnetization. Thus, by detecting the polarization dependency, the direction of magnetization in the recording medium can be detected with high SN accuracy. In a case where information is recorded in a magnetic recording layer of the recording medium through magnetization in the direction perpendicular to the plane of the medium, a metal plate having a hollow gap is provided in proximity to the medium surface and it is irradiated with polarized light. In such case, by detecting the polarization dependency of reflected light, the direction of local magnetization in the recording medium can be detected with high SN accuracy. In accordance with these techniques, magnetization information in a region, which is by far smaller than the diameter of condensed light, can be detected with high SN accuracy.

In accordance with the invention, a method and apparatus for detecting magnetization in a magnetic recording medium in which information is recorded in high density can be obtained.

BRIEF DESCRIPTION OF THE DRAWINGS

FIGS. 3A to 3B show the rate of change of the square of an electric field in the direction of a probe when a polarization state is changed, in which FIG. 3A shows a diagram when magnetization is parallel and FIG. 3B shows a diagram when magnetization is anti-parallel to the incidence direction of incident light.

FIGS. 10A and 10B show the rate of change of the square of an electric field in the direction parallel to the incidence plane when the polarization state of incident light is changed, in which FIG. 10A shows a diagram when the direction of magnetization is upward and 10B shows a diagram when the direction of magnetization is downward.

DESCRIPTION OF THE PREFERRED EMBODIMENTS OF THE INVENTION

The principle of magnetization detection according to the invention and its embodiments will be described with reference to the drawings in the following.

Embodiment 1

Figure 1:
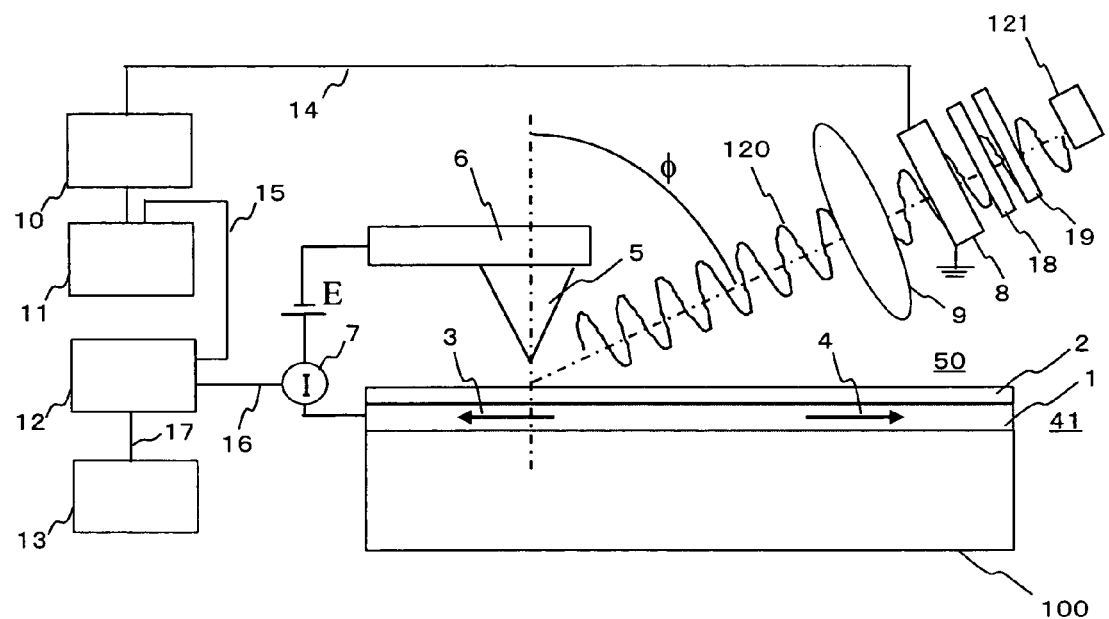
FIG. 1 shows a conceptual diagram of a magnetization detecting apparatus according to a first embodiment of the invention.

FIG. 1 shows a conceptual diagram of a magnetization detecting apparatus according to a first embodiment of the invention. A magnetic recording medium 50 includes a multilayer film 41 including a ferromagnetic layer 1 and a protection film 2 that are sequentially stacked on a substrate 100. The ferromagnetic layer 1 is a magnetic recording layer in which information is recorded based on the direction of magnetization. Opposite to the protection film 2 of the multilayer film 41, a metal probe 5 is disposed at a very close distance of on the order of 1 nm. The metal probe 5 is held by a slider mechanism 6, as in a hard disk drive. A tunnel current may be used as a feedback signal for controlling the distance between the protection film 2 and the metal probe 5. The feedback signal may be generated using an optical lever technique in atomic force microscopy. Further, another probe for controlling the distance may be provided, in addition to the metal probe 5.

For the ferromagnetic layer 1 of the multilayer film 41, a ferromagnetic single metal such as Fe, Co, or Ni, its alloy, or its Permalloy may be used, for example. For the protection film 2, a nonmagnetic noble metal, such as Au, may be used. While the protection film 2 needs to be a metal, the ferromagnetic layer 1 does not necessarily need to be a metal.

Local magnetization information 3 or 4, which is written in the ferromagnetic layer 1 in the direction of the plane, can be read using a tunnel current that flows between the metal probe 5 and the multilayer film 41, as shown in the following.

In order to read magnetization information using the tunnel current, the vicinity of the gap between the metal probe 5 and the protection film 2 is irradiated with a light 120 emitted from a semiconductor laser 121 at an angle of Φ measured from a direction perpendicular to the surface of the magnetic recording medium 50. The polarization direction of the light 120 emitted from the semiconductor laser 121 is modulated via a polarizing plate 19, a phase plate 18, and a modulator 8. The light is then condensed with a lens 9, and the vicinity of the gap between the metal probe 5 and the protection film 2 is irradiated therewith. The modulator 8 modulates the polarization state of incident light with an applied voltage 14 based on a modulation signal, utilizing an electro-optic effect as used in a Pockels cell. Instead of the lens 9, a concave mirror may be used for condensing light. By properly selecting the energy of incident light, it becomes possible to excite plasmon between the metal probe 5 and the protection film 2 efficiently.

Figure 2:
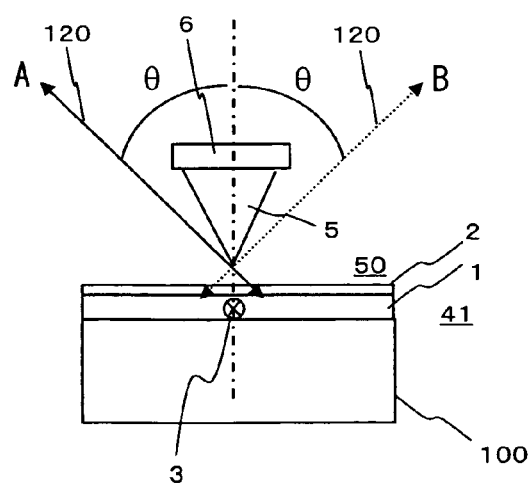
FIG. 2 shows a right side view of FIG. 1.

FIG. 2 shows a right side view of FIG. 1. The magnetic recording medium 50 includes the multilayer film 41 including the ferromagnetic layer 1 and the protection film 2 that are sequentially stacked on the substrate 100. Opposite to the surface of the protection film 2 of the multilayer film 41, the metal probe 5 held by the slider mechanism 6 is disposed at a very close distance of on the order of 1 nm. The polarized light 120, with which the vicinity of the gap between the metal probe 5 and the protection film 2 is irradiated, is two kinds of linearly-polarized light A and B having angles of ±θ with respect to the direction perpendicular to the surface of the magnetic recording medium 50.

An electric field component (p polarized light component) parallel to the incidence plane and in the direction of the probe can be expressed as $E_p = E_0 \cos(\theta)\sin(\Phi)\sin(\omega t)$, and an electric field component (s polarized light component) in the direction perpendicular to the incidence plane can be expressed as $E_s = E_0 \sin(\theta)\sin(\omega t)$. The reflectance, when p or s polarized light is incident on a medium with a dielectric constant of $\epsilon_{xx}$ and $\epsilon_{xy}$, can be represented as follows:

$$r_{sp} = r_{ps} = \epsilon_{xy}\cos(\Phi)\sin(\gamma)/(\epsilon_{xx}\cos(\gamma)(\sqrt{\epsilon_{xx}}\cos(\gamma) + \cos(\Phi))(\sqrt{\epsilon_{xx}}\cos(\Phi) + \cos(\gamma)))$$

$$r_{pp} = (\sqrt{\epsilon_{xx}}\cos(\Phi) - \cos(\gamma))/(\sqrt{\epsilon_{xx}}\cos(\Phi) + \cos(\gamma))$$

where $r_{sp}$ is the reflectance of the s polarized light when the p polarized light is incident, $r_{ps}$ is the reflectance of the p polarized light when the s polarized light is incident, $r_{pp}$ is the reflectance of the p polarized light when the p polarized light is incident, and $\gamma = \sin^{-1}(1/\sqrt{\epsilon_{xx}}\sin(\Phi))$.

In a case where the polarization of the incident light 120 is A and B, electric fields $e_A$ and $e_B$ in the direction of the probe, respectively, can be represented as follows:

$$e_A = E_0((1+r_{pp})\cos(\theta)\sin(\Phi)\sin(\omega t) - r_{sp}\sin(\theta)\sin(\Phi)\sin(\omega t))$$

$$e_B = E_0((1+r_{pp})\cos(\theta)\sin(\Phi)\sin(\omega t) + r_{sp}\sin(\theta)\sin(\Phi)\sin(\omega t))$$

Figure 3:
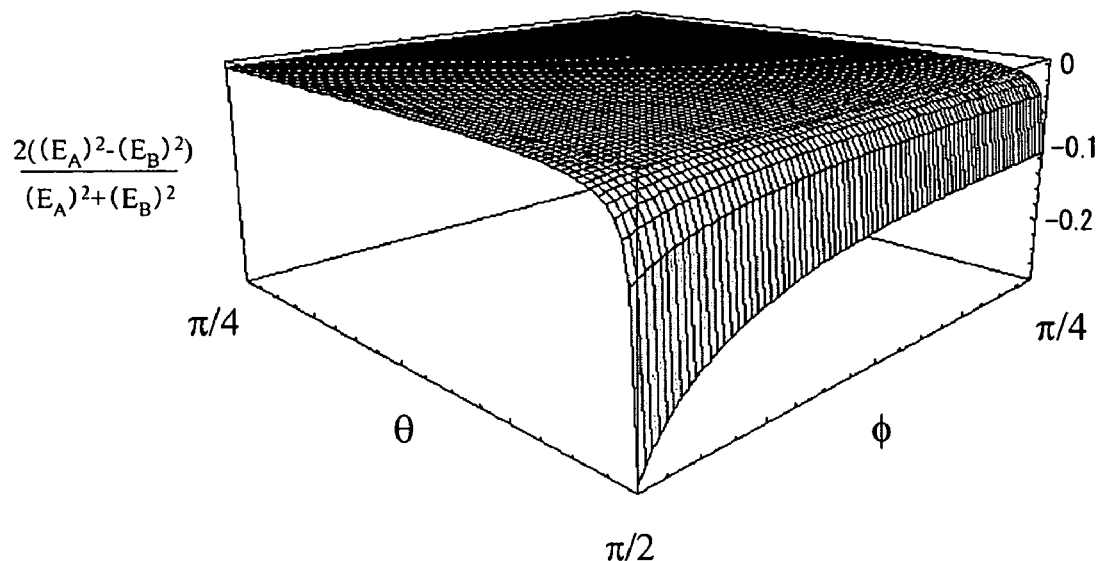
Figure 3:
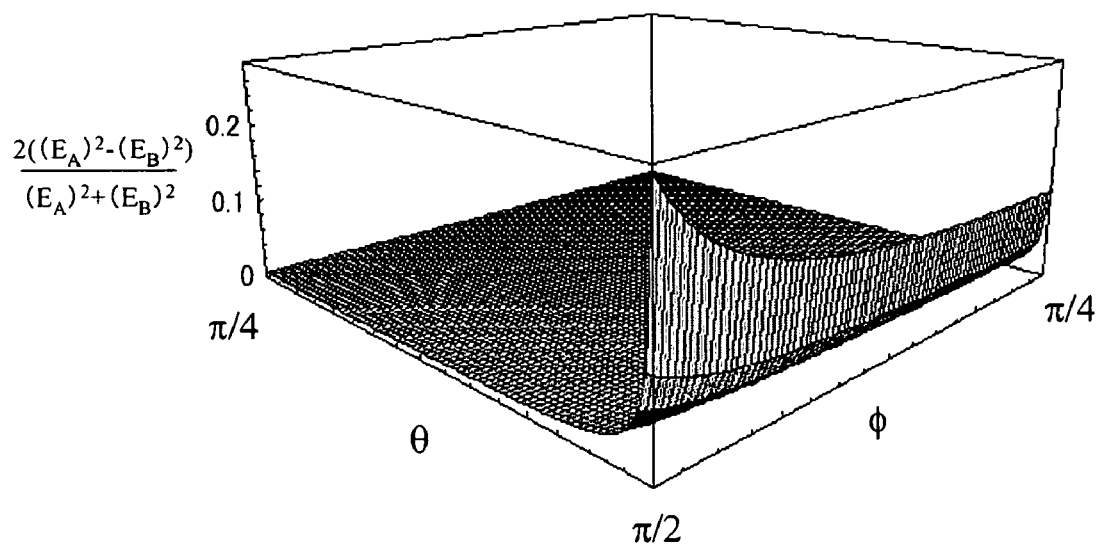

FIG. 3A shows the rate of change of the square of the electric field in the direction of the probe, which is the quotient when the difference $(E_A)^2 - (E_B)^2$ between the squares of the maximum values of the electric field in the direction of the probe in cases where the polarization of the incident light 120 is A and B is divided by their average value $((E_A)^2 - (E_B)^2)/2$, as a function of incidence angle Φ and polarization direction θ, in a case where magnetization is parallel to the incidence direction, that is, in the case of magnetization 3. In the present embodiment, Fe is used for the magnetic layer and 800 nm for the wavelength of incident light. For the complex dielectric constant of Fe at 800 nm, $\epsilon_{xx} = -3.83 + 22.1I$ and $\epsilon_{xy} = -1.33 + 0.024I$ are used. It can be seen that the rate of change of the square of the electric field in the direction of the probe varies between −0.1 and −40%, as a function of incidence angle Φ and polarization direction θ.

Similarly, FIG. 3B shows the rate of change in the square of the electric field in the direction of the probe, which is the quotient when the difference $(E_A)^2 - (E_B)^2$ between the squares of the electric field in the direction of the probe in cases where the polarization of the incident light 120 is A and B is divided by their average value $((E_A)^2 - (E_B)^2)/2$, as a function of incidence angle Φ and polarization direction θ, in a case where magnetization is anti-parallel to the incidence direction, that is, in the case of magnetization 4. It can be seen that the rate of change of the square of the electric field in the direction of the probe varies between +0.1 and +40%, as a function of incidence angle Φ and polarization direction θ.

Figure 4:
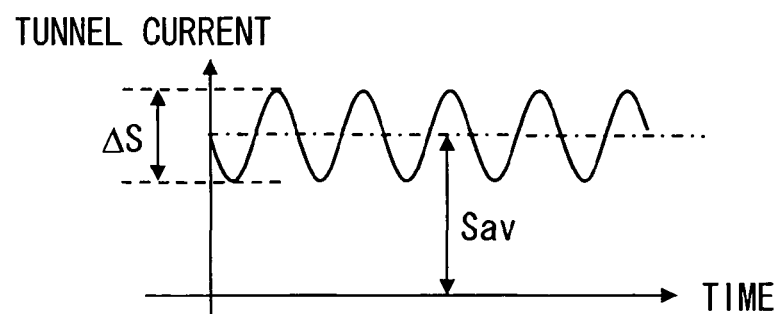
FIGS. 4A and 4B show the change in tunnel current in terms of time when magnetization is parallel and anti-parallel to the incidence direction of incident light, respectively.
FIG. 4C shows the change in the polarization state of incident light in terms of time.
Figure 4:
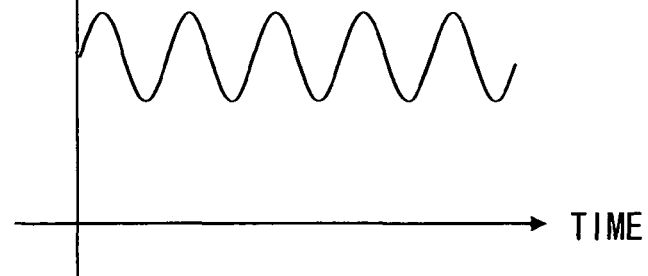
Figure 4:
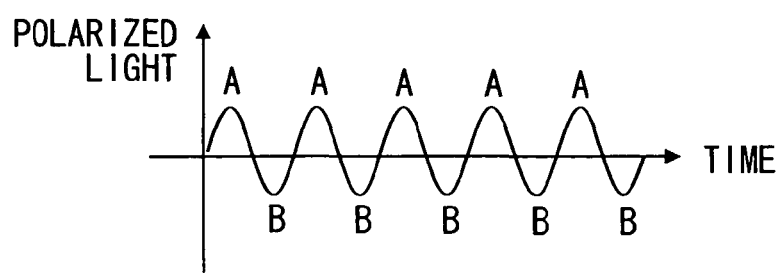
Figure 5:
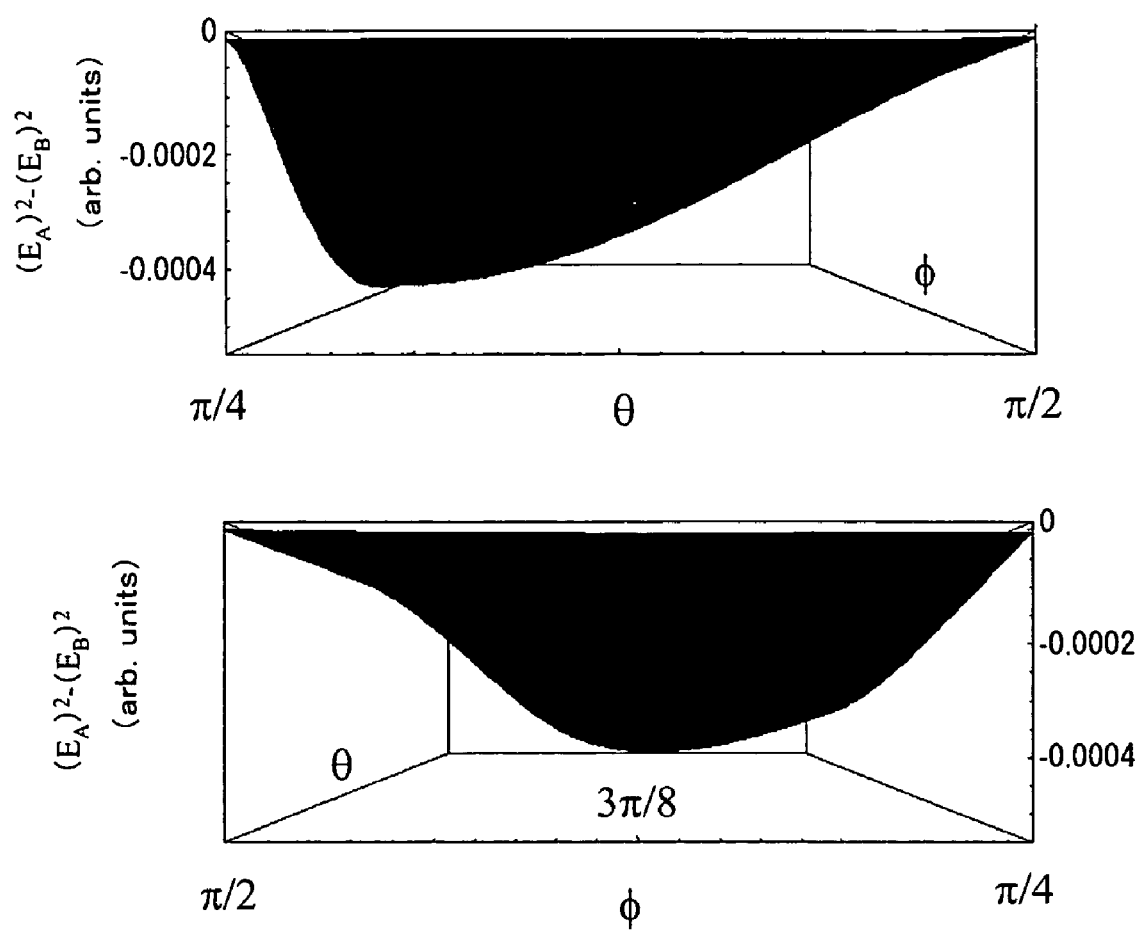
FIG. 5 shows the difference in amplitude of the square of an electric field in the direction of the probe when the polarization state is changed.

Since the amplitude of a detected tunnel current is proportional to the square of the electric field in the direction of the probe, the amplitude of the tunnel current in the polarization directions A and B varies, depending on whether the direction of magnetization is parallel or anti-parallel to the incidence direction. Namely, when the polarization of the incident light 120 is modulated into A and B in terms of time as shown in FIG. 4C, the tunnel current that flows between the metal probe 5 and the multilayer film 41 becomes such as shown in FIG. 4A when magnetization is parallel to the incidence direction, while the tunnel current becomes such as shown in FIG. 4B when magnetization is anti-parallel to the incidence direction. Thus, the phase of the tunnel current that flows between the metal probe 5 and the multilayer film 41 inverts between when magnetization is parallel to the incidence direction and when magnetization is anti-parallel to the incidence direction. Further, it is possible to obtain several dozen % of rate of change ΔS/Sav with respect to an average amplitude Sav of the tunnel current by appropriately selecting incidence angle Φ and polarization direction θ. It is noted, however, that, as shown in FIGS. 3A and 3B, the rate of change is not significantly dependent on Φ, and while the rate of change increases as θ comes close to π/2, the amplitude of the tunnel current obtained decreases as θ comes close to π/2, for example. As shown in FIG. 5, since the absolute value of the difference $(E_A)^2 - (E_B)^2$ between the squares of the electric field in the direction of the probe becomes maximum when Φ is approximately 3π/8 and θ is approximately π/4, it is desirable that Φ is in proximity to 3π/8 and θ is π/4≦θ<π/2.

As shown in FIG. 1, the tunnel current is detected via an ammeter 7 by applying a voltage E between the magnetic recording medium 50 and the metal probe 5. A modulation voltage 14, which is generated from a power supply 10 based on a modulation signal generated from a signal generator 11, is applied to the modulator 8, whereby the polarization state of the incident light 120 is modulated into A and B. A modulation signal 15 and a tunnel current signal 16 are inputted to a lock-in amplifier 12, and a modulation frequency component 17 alone in the tunnel current signal 16 is detected. Based on its positive/negative component, magnetization information written in the magnetic recording medium 50 is read via a reader 13.

Since the tunnel current reflects information immediately under the probe, by detecting the amplitude of the tunnel current as the polarization of the incident light 120 is modulated into A and B in terms of time, whether the direction of local magnetization recorded in the ferromagnetic layer 1 is parallel or anti-parallel to the incidence direction can be detected.

Further, by appropriately selecting the wavelength of incident light, the distance between the metal probe 5 and the magnetic recording medium 50, and the materials for the metal probe 5 and the protection film 2, an average amplitude Sav of the tunnel current can be amplified to the μA level due to a plasmon enhancement effect. While a detection method, using a tunnel current, causes shot noise, by using a μA-level

Embodiment 2

Figure 6:
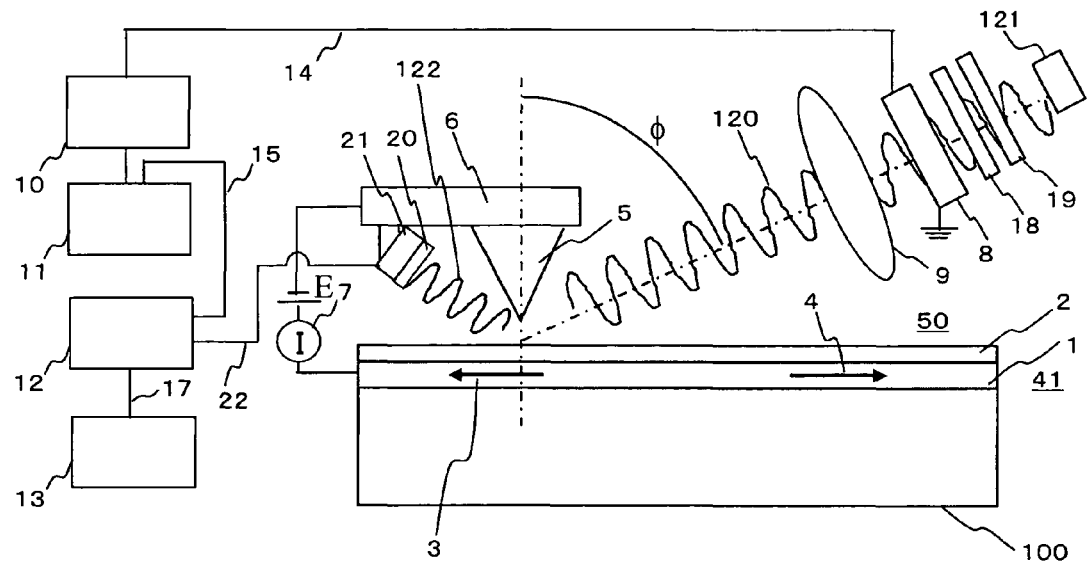
FIG. 6 shows a conceptual diagram of a magnetization detecting apparatus according to a second embodiment of the invention.

FIG. 6 shows a conceptual diagram of a magnetization detecting apparatus according to a second embodiment of the invention.

As in the first embodiment, a magnetic recording medium 50 includes a multilayer film 41 including a ferromagnetic layer 1 and a protection film 2 that are sequentially stacked on a substrate 100. The ferromagnetic layer 1 is a magnetic recording layer in which information is recorded based on the direction of magnetization. Opposite to the surface of the protection film 2 of the multilayer film 41, a metal probe 5 is disposed at a very close distance of on the order of 1 nm. The metal probe 5 is held by a slider mechanism 6, as in a hard disk drive. A tunnel current may be separately used as a feedback signal for controlling the distance between the protection film 2 and the metal probe 5. The feedback signal may be generated, using an optical lever technique in atomic force microscopy.

For the ferromagnetic layer 1 of the multilayer film 41, a ferromagnetic single metal such as Fe, Co, or Ni, its alloy, or its Permalloy may be used, for example. For the protection film 2, a nonmagnetic noble metal such as Au may be used. While the protection film 2 needs to be a metal, the ferromagnetic layer 1 does not necessarily need to be a metal.

Local magnetization information 3 or 4, which is written in the ferromagnetic layer 1 in the direction of the plane, can be read by irradiating the gap between the metal probe 5 and the multilayer film 41 with a polarized laser light 120 and detecting a polarized light component of a reflected light 122, which is perpendicular to the multilayer film 41 and in the axial direction of the metal probe, via a polarizing plate 20 and a detector 21, as shown in the following.

In order to read magnetization information, the vicinity of the gap between the metal probe 5 and the protection film 2 is irradiated with the light 120 emitted from a semiconductor laser 121 at an angle of Φ measured from a direction perpendicular to the surface of the magnetic recording medium 50. The polarization direction of the light 120 emitted from the semiconductor laser 121 is modulated via a polarizing plate 19, a phase plate 18, and a modulator 8. The light is then condensed via a lens 9, and the vicinity of the gap between the metal probe 5 and the protection film 2 is irradiated therewith. The modulator 8 modulates the polarization state of incident light with an applied voltage 14 based on a modulation signal, utilizing an electro-optic effect as used in a Pockels cell. Instead of the lens 9, a concave mirror may be used for condensing light. By appropriately selecting the energy of incident light, it becomes possible to excite plasmon between the metal probe 5 and the protection film 2 efficiently.

As in FIG. 2 in the first embodiment, the polarized light 120, with which the vicinity of the gap between the metal probe 5 and the protection film 2 is irradiated, is two kinds of linearly-polarized light A and B having angles of ±θ with respect to the direction perpendicular to the surface of the magnetic recording medium 50.

When magnetization is parallel to the incidence direction, the rate of change of the square of the electric field in the direction of the probe, in a case where the polarization of the incident light 120 is A and B, varies between −0.1 and −40% as a function of incidence angle Φ and polarization direction θ, as shown in FIG. 3A. In contrast, when magnetization is anti-parallel to the incidence direction, the rate of change of the square of the electric field in the direction of the probe, in a case where the polarization of the incident light 120 is A and B, varies between +0.1 and +40% as a function of incidence angle Φ and polarization direction θ, as shown in FIG. 3B.

The intensity of a polarized component of the reflected light 122 in the direction of the probe is detected via the polarizing plate 20 and the detector 21. Since the detected light intensity is proportional to the square of the electric field in the direction of the probe, the light intensity in the polarization directions A and B varies depending on whether the direction of magnetization is parallel or anti-parallel to the incidence direction. Namely, as in FIG. 4, when the polarization of the incident light 120 is modulated into A and B in terms of time, the phase of the intensity of the polarized light component of the detected reflected light in the direction of the probe inverts between when magnetization is parallel to the incidence direction and when magnetization is anti-parallel to the incidence direction. Further, it is possible to obtain several dozen % of rate of change ΔS/Sav with respect to an average amplitude Sav of the light intensity by appropriately selecting incidence angle Φ and polarization direction θ. As in FIG. 5 in the first embodiment, it is noted, however, that since the absolute value of the difference $(E_A)^2-(E_B)^2$ between the squares of the electric field in the direction of the probe becomes maximum when Φ is approximately $3\pi/8$ and θ is approximately $\pi/4$, it is desirable that Φ is in proximity to $3\pi/8$ and θ is $\pi/4 \leq \theta < \pi/2$.

As shown in FIG. 6, a modulation voltage 14, which is generated from a power supply 10 based on a modulation signal generated from a signal generator 11, is applied to the modulator 8, whereby the polarization state of the incident light 120 is modulated into A and B. A modulation signal 15 and a reflected polarization intensity signal 22 are inputted to a lock-in amplifier 12, and a modulation frequency component 17 alone in the reflected polarization intensity signal 22 is detected. Based on its positive/negative component, magnetization information written in the magnetic recording medium 50 is read via a reader 13.

The polarization intensity of reflected light strongly reflects local information immediately under the probe due to a plasmon enhancement effect between the probe and the surface. Thus, by detecting the reflected polarization intensity as the polarization of the incident light 120 is modulated into A and B in terms of time, whether the direction of local magnetization recorded in the ferromagnetic layer 1 is parallel or anti-parallel to the incidence direction can be detected.

Embodiment 3

Figure 7:
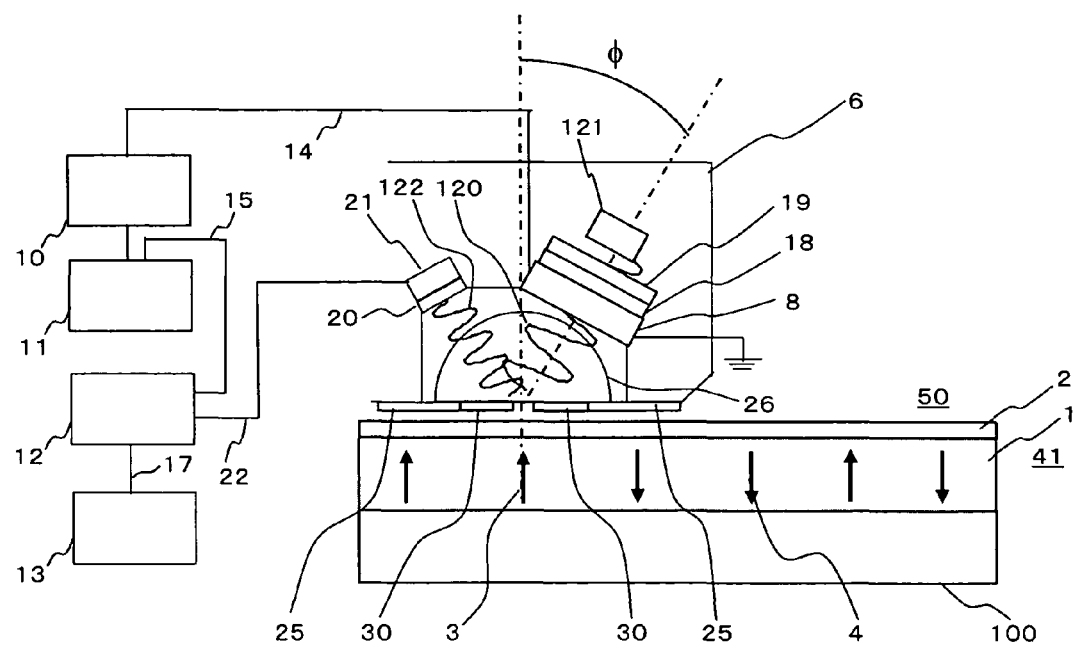
FIG. 7 shows a conceptual diagram of a magnetization detecting apparatus according to a third embodiment of the invention.

FIG. 7 shows a conceptual diagram of a magnetization detecting apparatus according to a third embodiment of the invention.

As in the first embodiment, a magnetic recording medium 50 includes a multilayer film 41 including a ferromagnetic layer 1 and a protection film 2 that are sequentially stacked on a substrate 100. The ferromagnetic layer 1 is a magnetic recording layer in which information is recorded based on the direction of magnetization. In this embodiment, directions 3 and 4 of magnetization in the ferromagnetic layer 1 are perpendicular to the plane. Opposite to the surface of the protection film 2 of the multilayer film 41, a metal plate 30 is disposed at a very close distance of on the order of 10 nm. The metal plate 30 is formed underneath the bottom surface of a hemispherical lens 26 and held by a slider mechanism 6, as in a hard disk drive.

Figure 8:
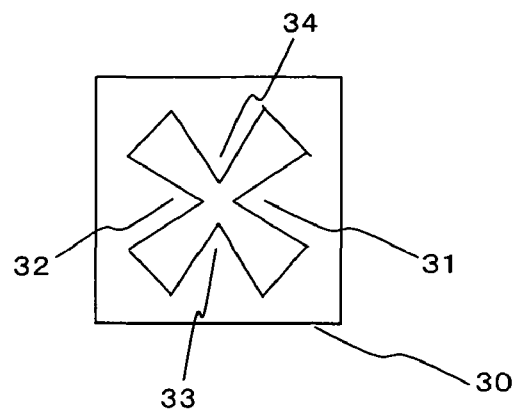
FIG. 8 shows a top view of a metal plate.

FIG. 8 shows a top view of the metal plate 30. The metal plate 30 is structured such that metal edges 31 and 32 or metal edges 33 and 34 face to each other, having a hollow gap therebetween. The direction of the gap between the metal edges 31 and 32 that face to each other is parallel to the incidence plane of the incident light 120, and the direction of the gap between the metal edges 33 and 34 that face to each other is perpendicular to the incidence plane of the incident light 120.

The ferromagnetic layer 1 of the multilayer film 41 has perpendicular magnetic anisotropy, and it may be made of an amorphous alloy of a rare earth, such as TbFeCo, and a transition metal, or a Co/Pt multilayer film, for example. For the protection film 2, a nonmagnetic noble metal, such as Au, may be used.

Local magnetization information 3 or 4, which is written in the ferromagnetic layer 1 in the direction perpendicular to the plane, can be read by irradiating the vicinity of the gap in the metal plate 30 with a polarized laser light 120 and detecting a polarized light component of a reflected light 122 via a polarizing plate 20 and a detector 21, as shown in the following.

In order to read magnetization information, the vicinity of the gap in the metal plate 30 is irradiated with the light 120 emitted from a semiconductor laser 121 at an angle of Φ measured from a direction perpendicular to the surface of the magnetic recording medium 50. The polarization direction of the light 120 emitted from the semiconductor laser 121 is modulated via a polarizing plate 19, a phase plate 18, and a modulator 8. The light is then condensed via the hemispherical lens 26, and the vicinity of the gap in the metal plate 30 is irradiated therewith. The modulator 8 modulates the polarization state of incident light with an applied voltage 14 based a modulation signal, utilizing an electro-optic effect as used in a Pockels cell. Instead of the hemispherical lens 26, a concave mirror may be used for condensing light. By appropriately selecting the energy of incident light, it becomes possible to excite plasmon between the metal plate 30 and the protection film 2 efficiently.

Figure 9:
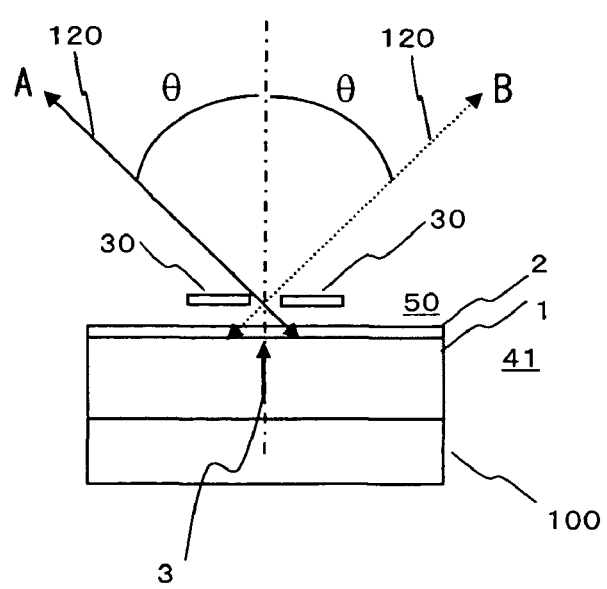
FIG. 9 shows a right side view of FIG. 7.

FIG. 9 shows a right side view of FIG. 7. As shown in FIG. 9, the polarized light 120, with which the vicinity of the gap in the metal plate 30 is irradiated, is two kinds of linearly-polarized light A and B having angles of ±θ with respect to the direction perpendicular to the surface of the magnetic recording medium 50.

The reflectance, when p or s polarized light is incident on a medium with a dielectric constant of $\epsilon_{xx}$ and $\epsilon_{xy}$, can be represented as follows:

$$r_{sp}=r_{ps}=-\epsilon_{xy}\text{Cos}(\Phi)/(\text{Sqrt}(\epsilon_{xx})(\text{Sqrt}(\epsilon_{xx})\text{Cos}(\gamma)+\text{Cos}(\Phi))(\text{Sqrt}(\epsilon_{xx})\text{Cos}(\Phi)+\text{Cos}(\gamma)))$$

$$r_{pp}=(\text{Sqrt}(\epsilon_{xx})\text{Cos}(\Phi)-\text{Cos}(\gamma))/(\text{Sqrt}(\epsilon_{xx})\text{Cos}(\Phi)+\text{Cos}(\gamma))$$

where $r_{sp}$ is the reflectance of the s polarized light when the p polarized light is incident, $r_{ps}$ is the reflectance of the p polarized light when the s polarized light is incident, $r_{pp}$ is the reflectance of the p polarized light when the p polarized light is incident, and $\gamma=\text{Sin}^{-1}(1/\text{Sqrt}(\epsilon_{xx})\text{Sin}(\Phi))$.

In a case where the polarization of the incident light 120 is A and B, electric fields $e_A$ and $e_B$ in the direction parallel to the incidence plane, respectively, can be represented as follows:

$$e_A=E_0(r_{pp}\text{Cos}(\theta)\text{Sin}(\omega t)-r_{ps}\text{Sin}(\theta)\text{Sin}(\omega t))$$

$$e_B=E_0(r_{pp}\text{Cos}(\theta)\text{Sin}(\omega t)+r_{ps}\text{Sin}(\theta)\text{Sin}(\omega t))$$

Figure 10:
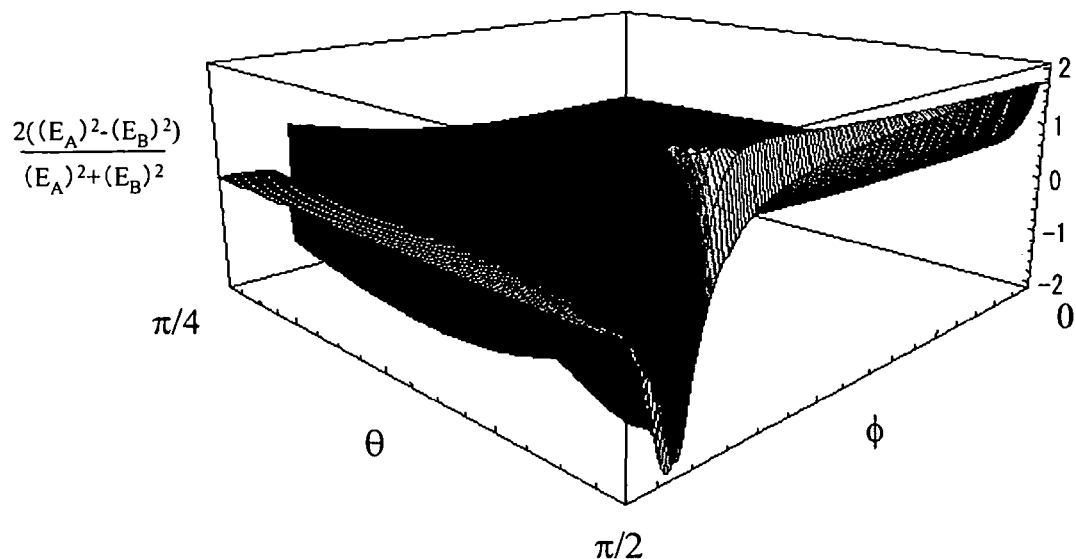
Figure 10:
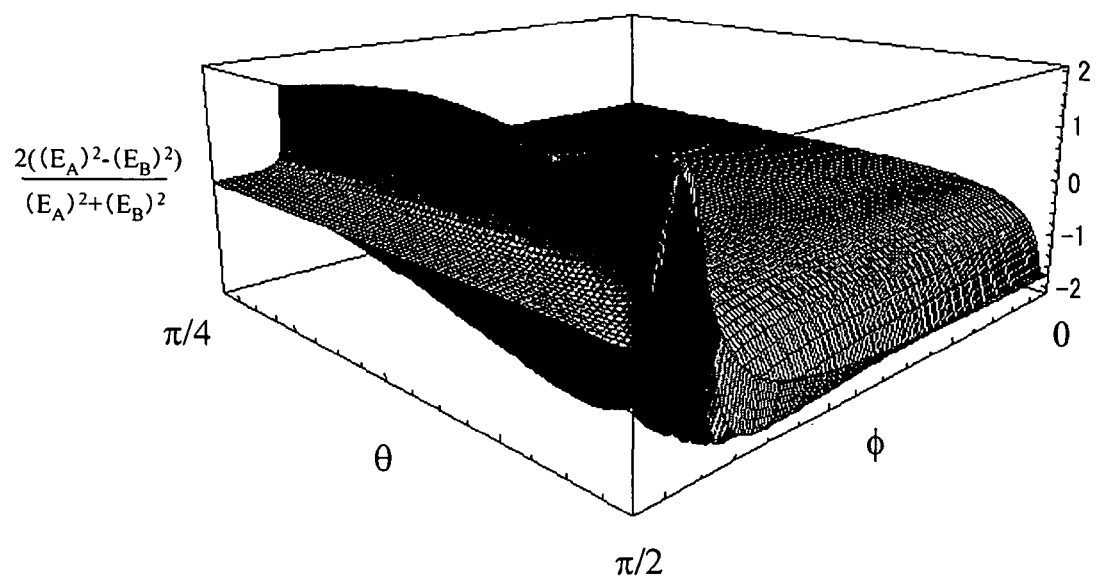

FIG. 10A shows the rate of change expressed as a function of incidence angle Φ and polarization direction θ, in a case where the direction of magnetization is upward. The rate of change is obtained by dividing the difference $(E_A)^2-(E_B)^2$ between the squares of the maximum values of the electric field in the direction parallel to the incidence plane, when the polarization of the incident light 120 is A and B, by their average value $((E_A)^2-(E_B)^2)/2$. In the present embodiment, for the complex dielectric constant of the magnetic layer, $\epsilon_{xx}=-3.83+22.1I$ and $\epsilon_{xy}=-1.33+0.024I$, which is the same as that of Fe, are used. For the wavelength of incident light, 800 nm is used. It can be seen that the rate of change of the square of the electric field in the direction parallel to the incidence plane varies between −200 and +200%, as a function of incidence angle Φ and polarization direction θ.

Similarly, FIG. 10B shows the rate of change expressed as a function of incidence angle Φ and polarization direction θ, in a case where the direction of magnetization is downward. The rate of change is obtained by dividing the difference $(E_A)^2-(E_B)^2$ between the squares of the maximum values of the electric field in the direction parallel to the incidence plane, when the polarization of the incident light 120 is A and B, by their average value $((E_A)^2-(E_B)^2)/2$. It can be seen that the rate of change of the square of the electric field in the direction parallel to the incidence plane varies between +200 and −200%, as a function of incidence angle Φ and polarization direction θ. As is clear from the comparison between FIGS. 10A and 10B, the plus/minus of the rate of change inverts at a certain incidence angle Φ and polarization direction θ, depending on whether the direction of magnetization is upward or downward.

Figure 11:
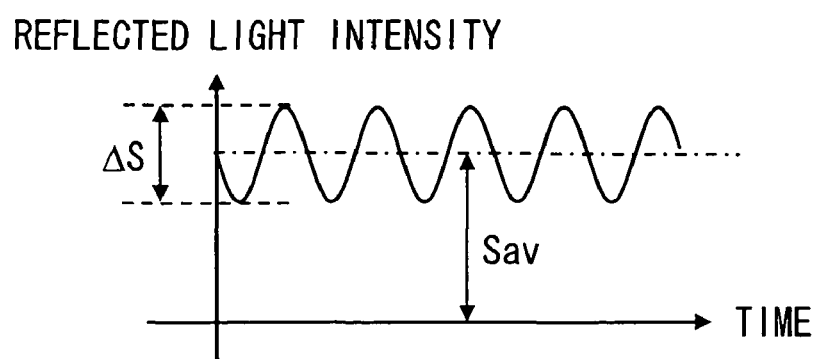
FIGS. 11A and 11B show the change in reflected polarization intensity in the direction parallel to the incidence plane in terms of time when the direction of magnetization is upward and downward, respectively.
FIG. 11C shows the change in the polarization state of incident light in terms of time.
Figure 11:
Figure 11:
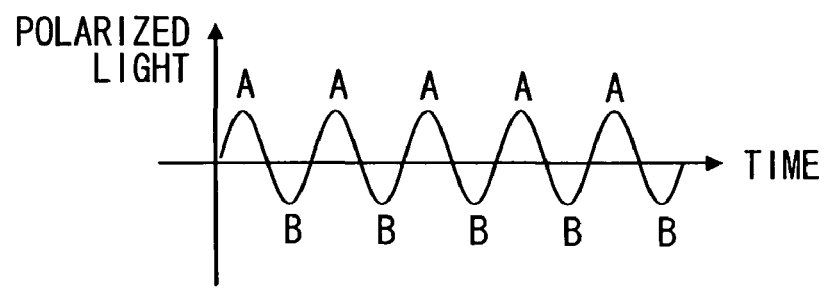
Figure 12:
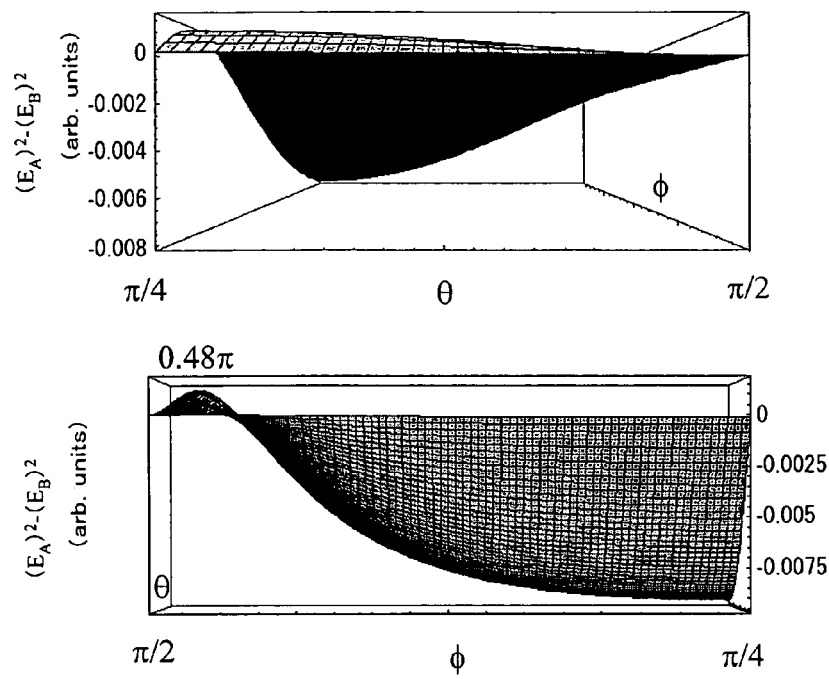
FIG. 12 shows the difference in amplitude of the square of an electric field in the direction of a probe when the polarization state is changed.

The intensity of a polarized light component of the reflected light 122 in the direction parallel to the incidence plane is detected via the polarizing plate 20 and the detector 21. Since the detected light intensity is proportional to the square of the electric field in the direction parallel to the incidence plane, the light intensity in the polarization directions A and B varies, depending on whether the direction of magnetization is upward or downward. Namely, as shown in FIGS. 11A to 11C, when the polarization of the incident light 120 is modulated into A and B in terms of time, the phase of the intensity of the polarized light component of the detected reflected light in the direction parallel to the incidence plane inverts between when the direction of magnetization is upward and when the direction of magnetization is downward. Further, it is possible to obtain a several hundred % of the rate of change ΔS/Sav with respect to an average amplitude Sav of the light intensity by appropriately selecting incidence angle Φ and polarization direction θ. It is noted, however, that since the absolute value of the difference $(E_A)^2-(E_B)^2$ between the squares of the maximum values of the electric field in the direction parallel to the incidence plane becomes maximum when Φ is approximately 0 or 0.48π and θ is approximately π/4, as shown in FIG. 12, it is desirable that Φ is 0<Φ≦0.48π and θ is approximately π/4.

As shown in FIG. 7, a modulation voltage 14, which is generated from a power supply 10 based on a modulation signal generated from a signal generator 11, is applied to the modulator 8, whereby the polarization state of the incident light 120 is modulated into A and B. A modulation signal 15 and a reflected polarization intensity signal 22 are inputted to a lock-in amplifier 12, and a modulation frequency component 17 alone in the reflected polarization intensity signal 22 is detected. Based on its positive/negative component, magnetization information written in the magnetic recording medium 50 is read via a reader 13.

The polarization intensity of reflected light strongly reflects local information immediately under the probe due to a plasmon enhancement effect between the probe and the surface. Thus, by detecting the reflected polarization intensity as the polarization of the incident light 120 is modulated into A and B in terms of time, whether the direction of local magnetization recorded in the ferromagnetic layer 1 is upward or downward can be detected.

Embodiment 4

Figure 13:
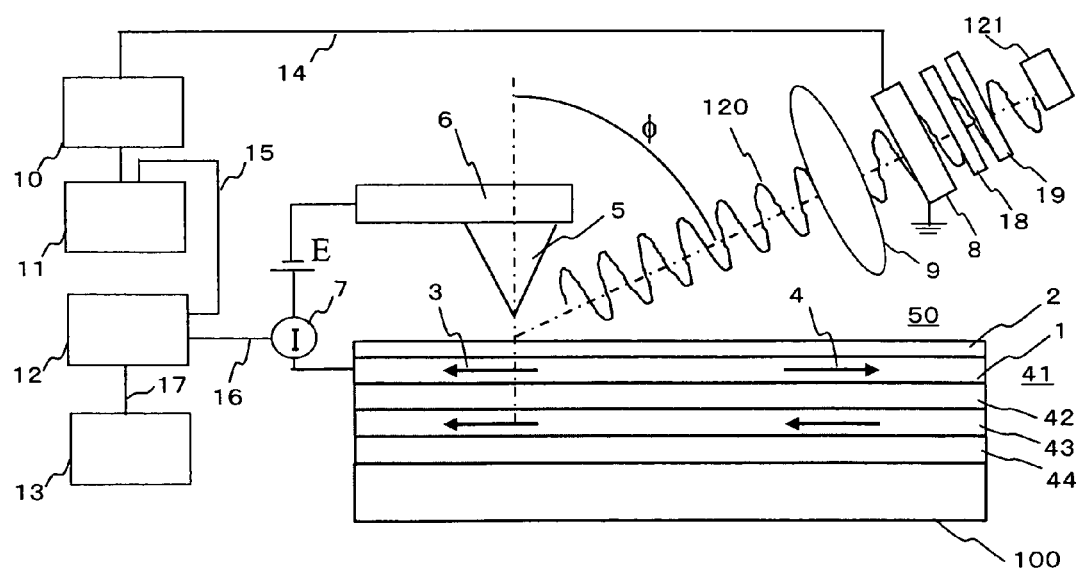
FIG. 13 shows a conceptual diagram of a magnetization detecting apparatus according to a fourth embodiment of the invention.

FIG. 13 shows a conceptual diagram of a magnetization detecting apparatus according to a fourth embodiment of the invention.

As can be easily seen when FIG. 13 and FIG. 1 are compared, a fourth embodiment differs from the first embodiment in that a magnetic recording medium 50 includes an antiferromagnetic layer 44, a ferromagnetic layer 43, a nonmagnetic layer 42, a ferromagnetic layer 1, and a protection layer 2 formed on a substrate 100. In the present embodiment, the antiferromagnetic layer 44 is not necessarily needed. For the ferromagnetic layer 1 and the ferromagnetic layer 43 of a multilayer film 41, a ferromagnetic single metal such as Fe, Co, or Ni, its alloy, or its Permalloy may be used, for example. The nonmagnetic layer 42 may be made of Au, Cu, or Pt, for example. The protection film 2 may be made of a nonmagnetic noble metal such as Au, for example. While the protection film 2 needs to be a metal, the ferromagnetic layer 1 and the ferromagnetic layer 43 do not necessarily need to be a metal. Opposite to the surface of the protection film 2 of the multilayer film 41, a metal probe 5 is disposed at a very close distance of on the order of 1 nm. The metal probe 5 is held by a slider mechanism 6, as in a hard disk drive.

In the fourth embodiment, as in the first embodiment, the direction of in-plane magnetization in the ferromagnetic metal layer 1 can be detected using a tunnel current that flows between the metal probe 5 and the multilayer film 41. The vicinity of the gap between the metal probe 5 and the protection film 2 is irradiated with a light 120 emitted from a semiconductor laser 121 at an angle of $\Phi$ measured from a direction perpendicular to the plane of the magnetic recording medium 50. The polarization direction of the light 120 emitted from the semiconductor laser 121 is modulated via a polarizing plate 19, a phase plate 18, and a modulator 8. The light is then condensed via a lens 9, and the vicinity of the gap between the metal probe 5 and the protection film 2 is irradiated therewith. By appropriately selecting the energy of incident light, it becomes possible to excite plasmon between the metal probe 5 and the protection film 2 efficiently.

The polarized light 120, with which the vicinity of the gap between the metal probe 5 and the protection film 2 is irradiated, is two kinds of linearly-polarized light A and B having angles of $\pm\theta$ with respect to the direction perpendicular to the surface of the magnetic recording medium 50, as shown in FIG. 2.

Figure 14:
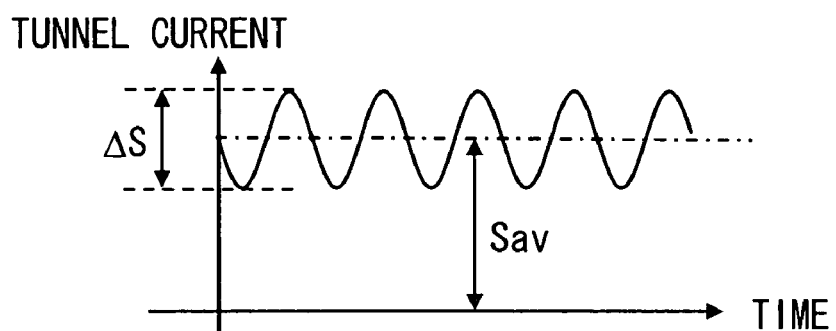
FIGS. 14A and 14B show the change in tunnel current in terms of time when magnetization is parallel and anti-parallel to the incidence direction of incident light, respectively.
FIG. 14C shows the change in the polarization state of incident light in terms of time.
Figure 14:
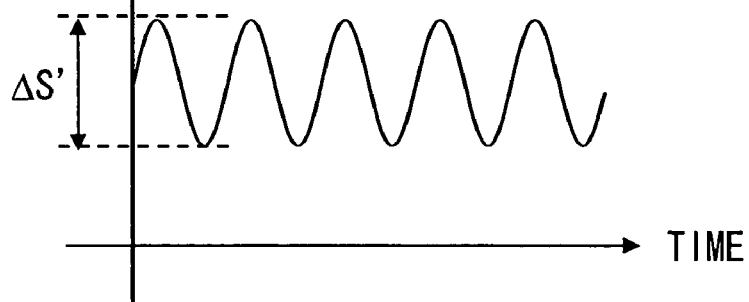
Figure 14:
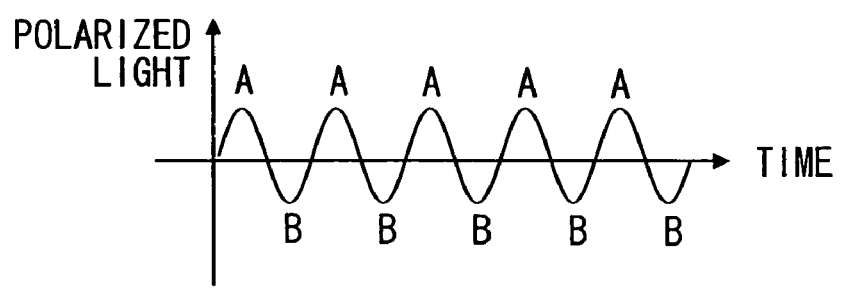

The amplitude of a tunnel current when the polarization directions is A and B varies, depending on whether the direction of magnetization is parallel or anti-parallel to the incidence direction. Namely, as shown in FIGS. 14A to 14C, in a case where the polarization of the incident light 120 is modulated into A and B in terms of time, the phase of the tunnel current inverts between when magnetization is parallel to the incidence direction (FIG. 14A) and when magnetization is anti-parallel to the incidence direction (FIG. 14B). Further, it is possible to obtain several dozen % of the rate of change $\Delta S/Sav$ with respect to an average amplitude Sav of the tunnel current by appropriately selecting incidence angle $\Phi$ and polarization direction $\theta$, as in the first embodiment.

However, with regard to the recording medium including a ferromagnetic layer, nonmagnetic layer, and ferromagnetic layer in the present embodiment, as disclosed in Patent Documents 3 and 4, since electronic states vary depending on whether magnetization in the ferromagnetic layers is parallel or anti-parallel, the dielectric constant that depends on the electronic states also varies. Thus, as $\Delta S$ and $\Delta S'$ show in FIGS. 14A and 14B, the change in the tunnel current when the polarization direction is modulated can be detected not only as the above-mentioned phase but also as a change in amplitude since the amplitude of the tunnel current varies depending on whether magnetization in the ferromagnetic layers is parallel or anti-parallel.

Embodiment 5

Figure 15:
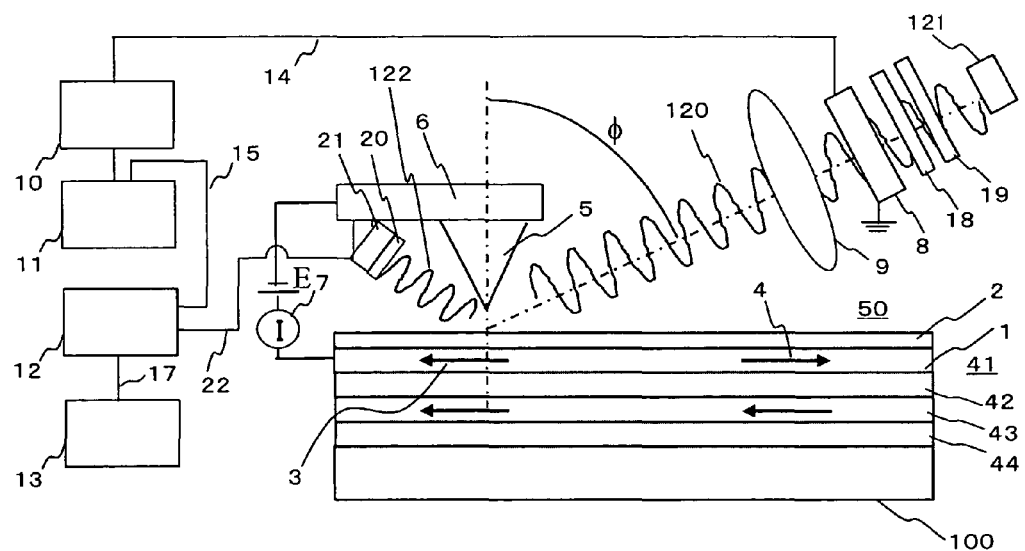
FIG. 15 shows a conceptual diagram of a magnetization detecting apparatus according to a fifth embodiment of the invention.

FIG. 15 shows a conceptual diagram of a magnetization detecting apparatus according to a fifth embodiment of the invention.

As can be easily seen when FIG. 15 and FIG. 6 are compared, a fifth embodiment differs from the second embodiment in that a magnetic recording medium 50 includes an antiferromagnetic layer 44, a ferromagnetic layer 43, a nonmagnetic layer 42, a ferromagnetic layer 1, and a protection layer 2 formed on a substrate 100. In the present embodiment, the antiferromagnetic layer 44 is not necessarily needed. For the ferromagnetic layer 1 and the ferromagnetic layer 43 of a multilayer film 41, a ferromagnetic single metal such as Fe, Co, or Ni, its alloy, or its Permalloy may be used, for example. The nonmagnetic layer 42 may be made of Au, Cu, or Pt, for example. The protection film 2 may be made of a nonmagnetic noble metal such as Au, for example. While the protection film 2 needs to be a metal, the ferromagnetic layer 1 and the ferromagnetic layer 43 do not necessarily need to be a metal. Opposite to the surface of the protection film 2 of the multilayer film 41, a metal probe 5 is disposed at a very close distance of on the order of 1 nm. The metal probe 5 is held by a slider mechanism 6, as in a hard disk drive.

In the fifth embodiment, as in the second embodiment, the direction of in-plane magnetization in the ferromagnetic metal layer 1 can be read by irradiating the gap between the metal probe 5 and the multilayer film 41 with a polarized laser light 120 and detecting a polarized light component of a reflected light 122, which is perpendicular to the multilayer film 41 and in the axial direction of the metal probe, via a polarizing plate 20 and a detector 21.

In order to read magnetization information, the vicinity of the gap between the metal probe 5 and the protection film 2 is irradiated with the light 120 emitted from a semiconductor laser 121 at an angle of $\Phi$ measured from a direction perpendicular to the surface of the magnetic recording medium 50. The polarization direction of the light 120 emitted from the semiconductor laser 121 is modulated via a polarizing plate 19, a phase plate 18, and a modulator 8. The light is then condensed via a lens 9, and the vicinity of the gap between the metal probe 5 and the protection film 2 is irradiated therewith. Instead of the lens 9, a concave mirror may be used for condensing light. By appropriately selecting the energy of incident light, it becomes possible to excite plasmon between the metal probe 5 and the protection film 2 efficiently.

The polarized light 120, with which the vicinity of the gap between the metal probe 5 and the protection film 2 is irradiated, is two kinds of linearly-polarized light A and B having angles of $\pm\theta$ with respect to the direction perpendicular to the surface of the magnetic recording medium 50, as shown in FIG. 2.

The rate of change of the square of the electric field in the direction of the probe, when the polarization of the incident light 120 is A and B, varies several dozen %, as shown in FIGS. 3A and 3B, depending on incidence angle $\Phi$, polarization direction $\theta$, and whether magnetization is parallel or anti-parallel to the incidence direction.

The intensity of a polarized light component of the reflected light 122 in the direction of the probe is detected via the polarizing plate 20 and the detector 21. Since the detected light intensity is proportional to the square of the electric field in the direction of the probe, the light intensity in the polarization directions A and B varies, depending on whether the direction of magnetization is parallel or anti-parallel to the incidence direction. Namely, as in FIGS. 14A to 14C, in cases where the polarization of the incident light 120 is modulated into A and B in terms of time, the phase of the intensity of the polarized light component of the detected reflected light in the direction of the probe inverts between when magnetization is parallel to the incidence direction and when magnetization is anti-parallel to the incidence direction. Further, it is possible to obtain several dozen % of the rate of change ΔS/Sav with respect to an average amplitude Sav of the light intensity by appropriately selecting incidence angle Φ and polarization direction θ.

However, with regard to the recording medium including a ferromagnetic layer, nonmagnetic layer, and ferromagnetic layer in the present embodiment, as disclosed in Patent Documents 3 and 4 , since electronic states vary depending on whether magnetization in the ferromagnetic layers is parallel or anti-parallel, the dielectric constant that depends on the electronic states also varies. Thus, as ΔS and ΔS' show in FIGS. 14A and 14B, the change in light intensity when the polarization direction is modulated can be detected not only as the above-mentioned phase but also as a change in amplitude, since the amplitude of the tunnel current varies depending on whether magnetization in the ferromagnetic layers is parallel or anti-parallel.

As shown in FIG. 15, a modulation voltage 14, which is generated from a power supply 10 based on a modulation signal generated from a signal generator 11, is applied to the modulator 8, whereby the polarization state of the incident light 120 is modulated into A and B. A modulation signal 15 and a reflected polarization intensity signal 22 are inputted to a lock-in amplifier 12, and a modulation frequency component 17 alone in the reflected polarization intensity signal 22 is detected. Based on its positive/negative component of the amplitude or the absolute value, magnetization information written in the magnetic recording medium 50 is read via a reader 13.

The polarization intensity of reflected light strongly reflects local information immediately under the probe due to a plasmon enhancement effect between the probe and the surface. Thus, by detecting the reflected polarization intensity as the polarization of the incident light 120 is modulated into A and B in terms of time, whether the direction of local magnetization recorded in the ferromagnetic layer 1 is parallel or anti-parallel to the incidence direction can be detected.

Embodiment 6

Figure 16:
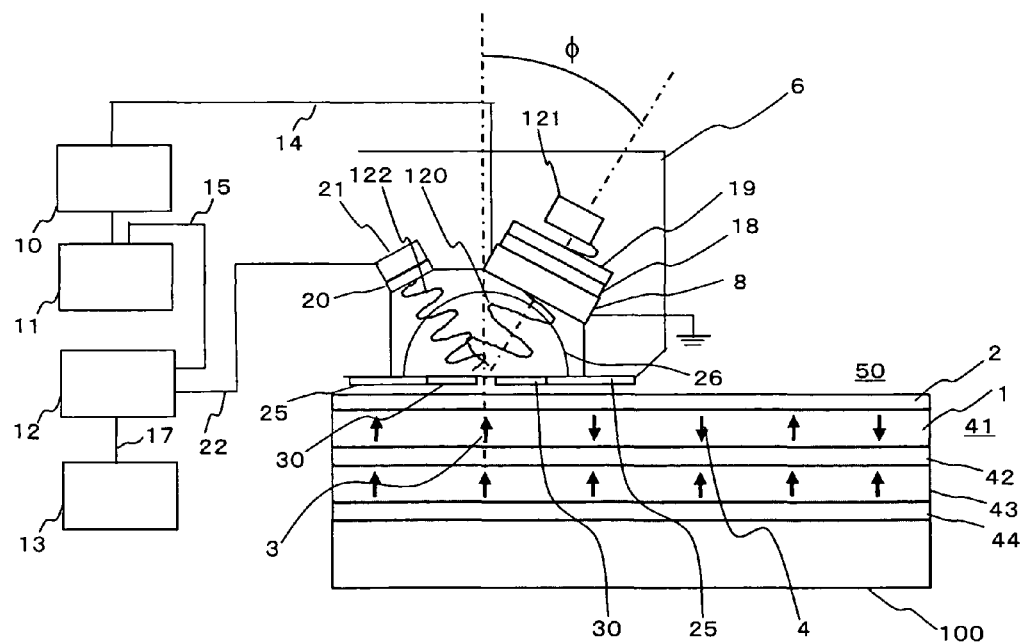
FIG. 16 shows a conceptual diagram of a magnetization detecting apparatus according to a sixth embodiment of the invention.

FIG. 16 shows a conceptual diagram of a magnetization detecting apparatus according to a sixth embodiment of the invention.

As can be easily seen when FIG. 16 and FIG. 7 are compared, a sixth embodiment differs from the third embodiment in that a magnetic recording medium 50 includes an antiferromagnetic layer 44, a ferromagnetic layer 43, a nonmagnetic layer 42, a ferromagnetic layer 1, and a protection layer 2 formed on a substrate 100. In the present embodiment, the antiferromagnetic layer 44 is not necessarily needed. The ferromagnetic layer 1 and the ferromagnetic layer 43 of a multilayer film 41 have perpendicular magnetic anisotropy, and they may be made of an amorphous alloy of a rare earth, such as TbFeCo, and a transition metal, or a Co/Pt multilayer film, for example. The nonmagnetic layer 42 may be made of Au, Cu, or Pt, for example. The protection film 2 may be made of a nonmagnetic noble metal such as Au, for example. While the protection film 2 needs to be a metal, the ferromagnetic layer 1 and the ferromagnetic layer 43 do not necessarily need to be a metal.

Local magnetization information 3 or 4, which is written in the ferromagnetic layer 1 in the direction perpendicular to the plane, can be read by irradiating the vicinity of the gap in a metal plate 30 with a polarized laser light 120 and detecting a polarized light component of a reflected light 122 via a polarizing plate 20 and a detector 21, as in the third embodiment.

The vicinity of the gap in the metal plate 30 is irradiated with the light 120 emitted from a semiconductor laser 121 at an angle of Φ measured from a direction perpendicular to the surface of the magnetic recording medium 50. The polarization direction of the light 120 emitted from the semiconductor laser 121 is modulated via a polarizing plate 19, a phase plate 18, and a modulator 8. The light is then condensed via a hemispherical lens 26 and the vicinity of the gap in the metal plate 30 is irradiated therewith. Instead of the hemispherical lens 26, a concave mirror may be used for condensing light. By appropriately selecting the energy of incident light, it becomes possible to excite plasmon between the metal plate 30 and the protection film 2 efficiently. As shown in FIG. 9, the polarized light 120, with which the vicinity of the gap in the metal plate 30 is irradiated, is two kinds of linearly-polarized light A and B having angles of ±θ with respect to the direction perpendicular to the surface of the magnetic recording medium 50.

Depending on whether the direction of magnetization in the magnetic layer 1 is upward or downward, as shown in FIGS. 10A and 10B, the rate of change varies between −200 and +200%, as a function of incidence angle Φ and polarization direction θ, and the plus/minus of the rate of change inverts. The rate of change is obtained by dividing the difference $(E_A)^2-(E_B)^2$ between the squares of the electric field in the direction parallel to the incidence plane, when the polarization of the incident light 120 is A and B, by their average value $((E_A)^2-(E_B)^2)/2$.

The intensity of a polarized light component of the reflected light 122 in the direction parallel to the incidence plane is detected via the polarizing plate 20 and the detector 21. The detected light intensity is proportional to the square of the electric field in the direction parallel to the incidence plane. Thus, when the polarization of incident light 120 is modulated into A and B in terms of time, the phase of the intensity of the polarized light component of the detected reflected light in the direction parallel to the incidence plane inverts, depending on whether the direction of magnetization is upward or downward. Further, it is possible to obtain a several hundred % of the rate of change ΔS/Sav with respect to an average amplitude Sav of the light intensity by appropriately selecting incidence angle Φ and polarization direction θ.

However, with regard to the recording medium including a ferromagnetic layer, nonmagnetic layer, and ferromagnetic layer in the present embodiment, as disclosed in Patent Documents 3 and 4 , since electronic states vary depending on whether magnetization in the ferromagnetic layers is parallel or anti-parallel, the dielectric constant that depends on the electronic states also varies. Thus, as ΔS and ΔS' show in FIGS. 14A and 14B, the change in light intensity, when the polarization direction is modulated, can be detected not only as the above-mentioned phase but also as a change in amplitude, since the amplitude of the tunnel current varies depending on whether magnetization in the ferromagnetic layers is parallel or anti-parallel.

As shown in FIG. 16, a modulation voltage 14, which is generated from a power supply 10 based on a modulation signal generated from a signal generator 11, is applied to the modulator 8, whereby the polarization state of the incident light 120 is modulated into A and B. A modulation signal 15 and a reflected polarization intensity signal 22 are inputted to a lock-in amplifier 12, and a modulation frequency component 17 alone in the reflected polarization intensity signal 22 is detected. Based on its positive/negative component of the amplitude or the absolute value, magnetization information written in the magnetic recording medium 50 is read via a reader 13.

The polarization intensity of reflected light strongly reflects local information immediately under the probe due to a plasmon enhancement effect between the probe and the surface. Thus, by detecting the reflected polarization intensity as the polarization of the incident light 120 is modulated into A and B in terms of time, whether the direction of local magnetization recorded in the ferromagnetic layer 1 is upward or downward can be detected.

Embodiment 7

A seventh embodiment of the invention will be described with reference to FIGS. 17 to 21.

Figure 17:
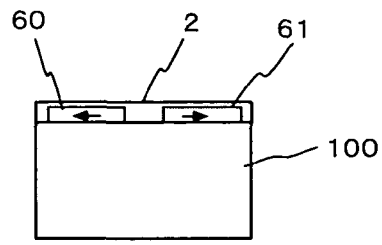
FIG. 17 shows a structure of nanopillars.
Figure 18:
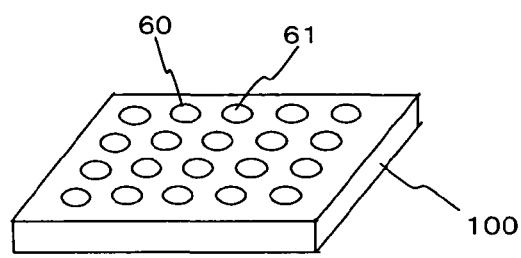
FIG. 18 shows a bird's-eye view of the structure of the nanopillars.
Figure 19:
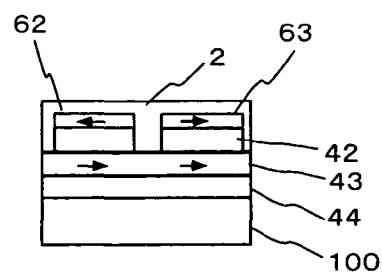
FIG. 19 shows another structure of the nanopillars.
Figure 20:
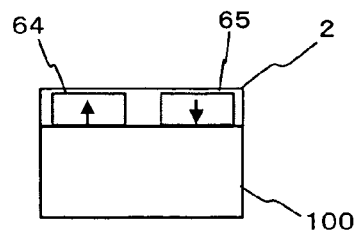
FIG. 20 shows another structure of the nanopillars.
Figure 21:
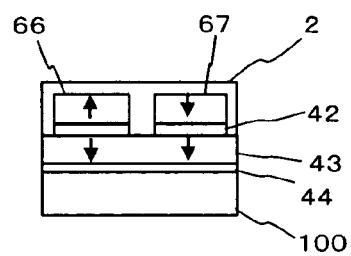
FIG. 21 shows another structure of the nanopillars.

In the present embodiment, a ferromagnetic layer, in which magnetization is recorded, is patterned in the shape of dots by a lithography technology widely used in semiconductor manufacturing, such as resist patterning, ion milling, and resist removing, as shown in FIGS. 17, 19, 20, and 21. A plurality of nanopillars 60, 61, 62, 63, 64, 65, 66, and 67 are regularly arranged apart from one another. FIG. 18 shows a bird's-eye view of the dot arrangement in FIG. 17, for example. FIGS. 17 and 19 show a case where magnetization is in the plane of the layer, and FIGS. 20 and 21 show a case where magnetization is perpendicular to the plane of the layer. As shown in FIGS. 19 and 21, the nanopillar may have a multilayer structure including a nonmagnetic layer 42.

In the present embodiment, regions, which are individual recording units, are patterned in the shape of dots, and the present embodiment differs from the first embodiment in that the nanopillars 60 and 61 corresponding to recording regions are formed as shown in FIG. 17, for example. As used herein, the nanopillar refers to an elliptical pillar or a square pillar having a nanometer-level diameter in terms of the planar size. Adoption of nanopillars incurs less influence from adjoining recording regions, thereby improving recording characteristics.

It is preferable that the nanopillars are arranged such that they can be compatible with the recording format of a current magnetic recording disk. Further, it is desirable that the gap between individual pillars is filled with a protection film 2, as shown in FIGS. 17, 19, 20, and 21.

In a case where magnetization is in the plane of the layer as shown in FIGS. 17 and 19, magnetization can be detected, using a tunnel current from a metal probe or polarization dependency of reflected polarization intensity, as in the first and second embodiments. In a case where magnetization is perpendicular to the plane of the layer, as shown in FIGS. 20 and 21, magnetization can be detected by using polarization dependency of reflected polarization intensity, as in the third embodiment.

Embodiment 8

Figure 22:
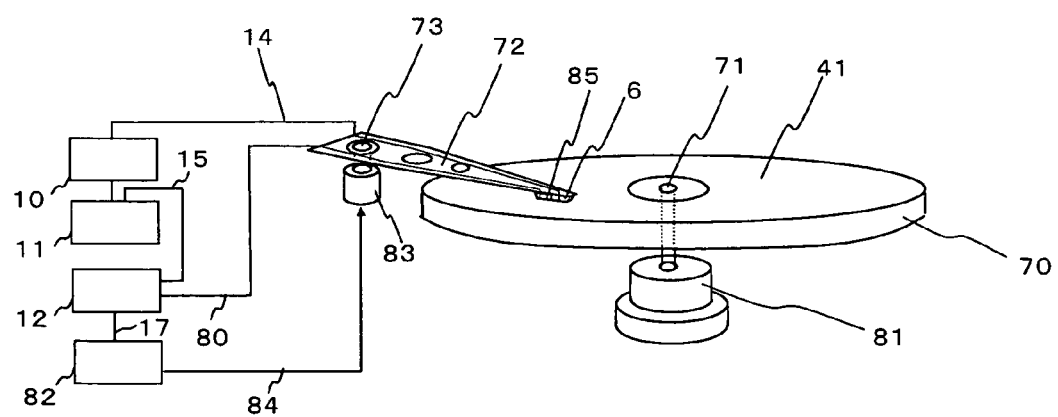
FIG. 22 shows a perspective view of a schematic structure of a magnetic recording apparatus.

FIG. 22 shows a perspective view of a schematic structure of a magnetic recording apparatus corresponding to the fifth embodiment of the invention. A multilayer film 41 described in each of the foregoing embodiments, for example, a multilayer film 41 including a ferromagnetic layer 1, protection film 2, and substrate 100, is formed as a disk recording medium 70. As described in the seventh embodiment, a recording layer may be patterned in the shape of dots. A metal probe or a metal plate, an incident polarized light generating means, and a reflected light detecting means, which are described in the foregoing embodiments, are attached to the bottom portion of a slider 6 provided at the tip portion of an arm 72. Numeral 73 denotes a rotatable supporting shaft of the arm 72. The position of the arm 72 is controlled by a mechanism, as in a conventional magnetic disk drive. When the disk recording medium 70 is rotated around the axis of a rotation center 71 by a spindle motor 81, as in a general magnetic disk drive, the slider 6 is raised by a predetermined distance due to an aerodynamic effect, whereby the slider 6 is disposed opposite to the multilayer film 41 with a substantially constant distance, as described in the foregoing embodiments.

In a case where the direction of magnetization written in the disk recording medium 70 is in the plane of the medium, the direction of written magnetization can be read by the method described in the first or the second embodiment. However, it is necessary to adjust the incident optical system or the direction of recorded magnetization such that the direction of written magnetization and the incidence plane of incident light become parallel to each other, as described in the first and second embodiments. Further, in a case where magnetization is perpendicular to the plane of the medium, the direction of written magnetization can be read by the method described in the third embodiment. When magnetization is read using a tunnel current from the metal probe, the multilayer film 41 is electrically conductive and is grounded via the conductive rotating shaft 71.

The polarization state of incident light is modulated into A and B by a modulation voltage 14, which is generated from a power supply 10 based on a modulation signal generated from a signal generator 11. A modulation signal 15 and a tunnel current signal or a reflected polarization intensity signal 80 are inputted to a lock-in amplifier 12, and a modulation frequency component 17 alone in the signal 80 is detected. Based on its positive/negative component, magnetization information written in the disk magnetic recording medium 70 is read via a reading control unit 82. An arm controlling motor 83 is controlled based on a control signal 84 outputted from the reading control unit, so as to control the reading position.

Figure 23:
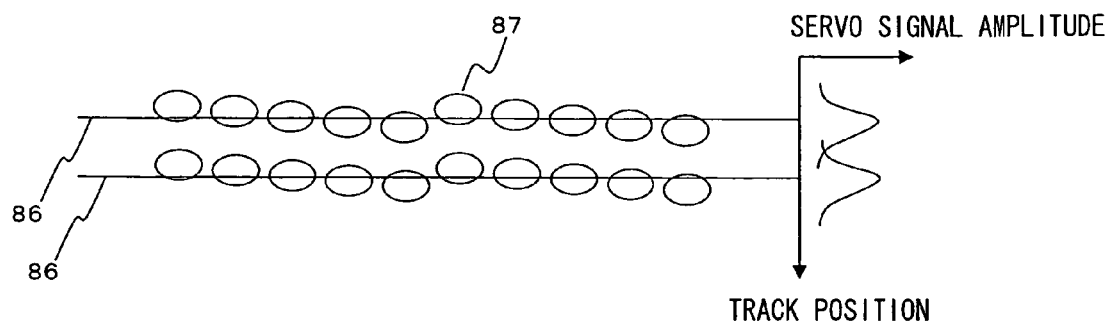
FIG. 23 shows a diagram for explaining the control of a reading position.

FIG. 23 shows a diagram for explaining the control of the reading position. The control of the reading position can be made by a servo signal of a recorded position, utilizing positional dependency of a detection signal. With regard to the disk recording medium 70, signals having significant polarization dependency can be obtained from a recording mark 87 in which magnetization is recorded, as described in the first, second, and third embodiments. However, portions in which no magnetization is recorded do not have polarization dependency. Thus, as shown in FIG. 23, for example, when a position detection pattern, such as a hound's-tooth check pattern, is written with the recording mark 87, the amplitude of the servo signal decreases if the reading position deviates from a track 86. Based on such difference in signal amplitude, the position of the track 86 can be detected.

Further, by mounting a writing magnetic head 85 on the slider 6, a magnetic recording/reproducing apparatus similar to a general magnetic disk drive can be made.

Figure 24:
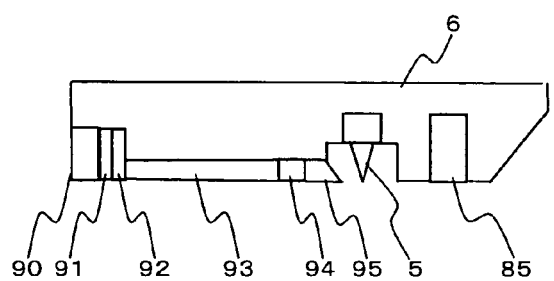
FIG. 24 shows a schematic diagram of a slider.
Figure 25:
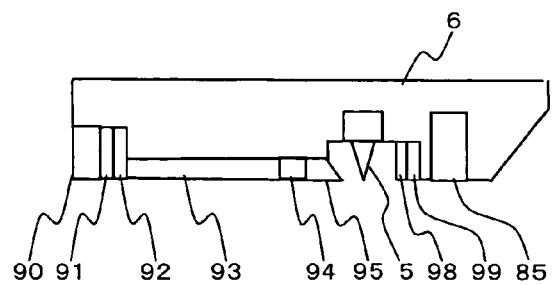
FIG. 25 shows another schematic diagram of a slider.

FIG. 24 schematically shows the slider 6 of the magnetic recording/reproducing apparatus based on the method for reading magnetization using a metal probe. The reading metal probe 5 and the writing magnetic head 85 are mounted on the bottom portion of the slider 6. Light emitted from a semiconductor laser 90 passes through a polarizing plate 91, a phase plate 92, a waveguide 93, and a modulator 94, and the tip portion of the metal probe 5 is irradiated therewith. By cutting the waveguide 93 such that an end face 95 is inclined at an appropriate angle, the light path is bent due to refraction, whereby the tip portion of the metal probe 5 can be irradiated with light efficiently. Further, by allowing the end face 95 to have an appropriate curvature, the tip portion of the metal probe 5 can be irradiated with light efficiently due to a lens effect. The modulator 94 is a Pockels cell that modulates the index of refraction through an electric field, and, as described in the first embodiment, by modulating polarized light and measuring a tunnel current, the direction of magnetization recorded in the multilayer film 41 can be detected. As shown in FIG. 25, by mounting a polarizing plate 98 and a photodetector 99, and measuring the reflected polarization intensity as described in the second embodiment, the direction of magnetization recorded in the multilayer film 41 can be detected.

Figure 26:
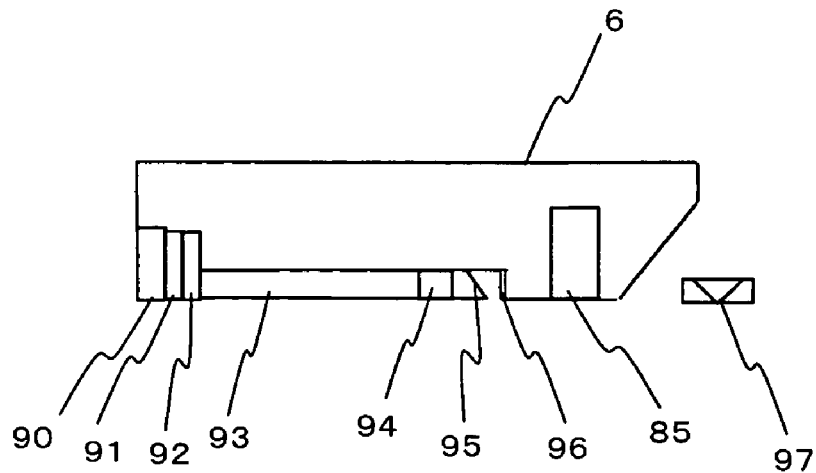
FIG. 26 shows another schematic diagram of a slider.
Figure 27:
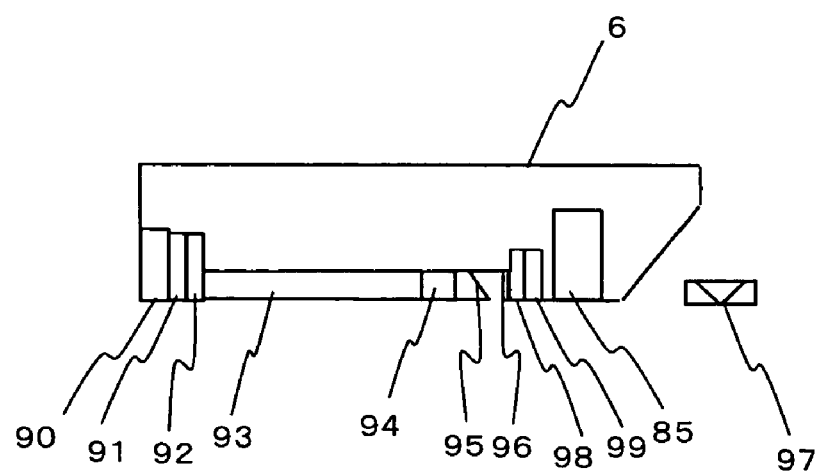
FIG. 27 shows another schematic diagram of a slider.

FIG. 26 shows a slider on which, instead of the metal probe 5, a metal film acute pattern 96 is mounted as a metal probe. Numeral 97 shows a right side view of an acute patterned metal film 96. The sharp tip of the acute patterned metal film 96 is positioned such that it faces the multilayer film 41. Such acute pattern 96 may be made of, for example, Au, formed by a lithography technology widely used in semiconductor manufacturing, such as resist patterning, ion milling, and resist removing, and attached to the slider 6. Similarly, by modulating polarized light and measuring a tunnel current, the direction of magnetization recorded in the multilayer film 41 can be detected. As shown in FIG. 27, by mounting the polarizing plate 98 and the photodetector 99 to the back side of the metal film acute pattern 96, and measuring the reflected polarization intensity as described in the second embodiment, the direction of magnetization recorded in the multilayer film 41 can be detected.

What is claimed is:

1. A magnetization detecting method, comprising:
    disposing a metal probe opposite to a recording medium having a magnetic recording layer in which information is recorded based on the direction of in-plane magnetization;
    irradiating a region of the recording medium opposite to the metal probe with incident light having its polarization state modulated; and
    detecting the direction of magnetization in the region of the recording medium opposite to the metal probe based on the change in tunnel current that flows between the metal probe and the surface of the recording medium or the change in polarization intensity of reflected light reflected by the metal probe and the surface of the recording medium;
    wherein linearly-polarized light having an oblique incident angle $\Phi$ with $\pi/4 \leq \Phi < \pi/2$ and two symmetric angles of $+\theta$ and $-\theta$ with $\pi/4 \leq \theta < \pi/2$ with respect to the direction perpendicular to the surface of the recording medium is alternately caused to be incident; and
    wherein a difference between squares of an electric field of the reflected light in a direction of the probe is measured.

2. A magnetization detecting apparatus, comprising:
    a recording medium having a magnetic recording layer in which information is recorded based on the direction of in-plane magnetization;
    a metal probe disposed opposite to the recording medium;
    a light source;
    a means for irradiating a region of the recording medium to which the metal probe is opposite with light from the light source;
    a modulating means for modulating the polarization state of incident light, which is emitted from the light source and incident on the recording medium; and
    a detecting means for detecting a tunnel current that flows between the metal probe and the surface of the recording medium or the polarization intensity of reflected light reflected by the surface of the recording medium,
    wherein the direction of magnetization in the region of the recording medium to which the metal probe is opposite is detected based on the change in the tunnel current that is attributable to modulation of the polarization state of the incident light or the change in the polarization intensity of the reflected light, both of which are detected by the detecting means;
    wherein the modulating means alternately changes the polarization direction of the incident light to the directions having an oblique incident angle $\Phi$ with $\pi/4 \leq \Phi \leq \pi/2$ and two symmetric angles of $+\theta$ and $-\theta$ with $\pi/4 \leq \theta \leq \pi/2$ respect to the direction perpendicular to the surface of the recording medium; and
    wherein a difference between squares of an electric field of the reflected light in a direction of the probe is measured.

3. The magnetization detecting apparatus according to claim 2, wherein the recording medium comprises either a multilayer-film structure in which a ferromagnetic layer, a nonmagnetic layer, and a ferromagnetic layer are formed on a substrate or a multilayer-film structure in which an anti-ferromagnetic layer, a ferromagnetic layer, a nonmagnetic layer and a ferromagnetic layer are formed on a substrate.

4. The magnetization detecting apparatus according to claim 2, wherein the magnetic recording layer comprises spatially divided magnetization regions for individual items of information to be recorded.

5. The magnetization detecting apparatus according to claim 2, comprising:
    a driving means for rotating the recording medium;
    an arm of which one end is rotatably supported and the other end is extended above the recording medium; and
    a slider provided on the tip portion of the arm,
    wherein the metal probe is provided on the slider, and wherein the slider is raised due to the rotation of the recording medium whereby a substantially fixed distance is maintained between the metal probe and the recording medium.

6. The magnetization detecting apparatus according to claim 5, wherein the slider comprising a means for guiding light from the light source to the vicinity of the tip portion of the metal probe and causing it to be incident.

7. The magnetization detecting apparatus according to claim 5, wherein the metal probe is formed of a metal pattern having a sharp tip provided on the slider, and wherein the apparatus comprises a means for guiding light from the light source to the tip portion of the metal pattern and causing it to be incident.

8. A magnetization detecting apparatus, comprising:
    a recording medium having a magnetic recording layer in which information is recorded based on the direction of magnetization perpendicular to the plane of the layer;
    a metal plate disposed opposite to the recording medium and having metal edges facing to each other via a gap;
    a light source;

a means for irradiating a region of the recording medium to which the metal plate is opposite with light from the light source;

a modulating means for modulating the polarization state of incident light, which is emitted from the light source and incident on the recording medium; and a detecting means for detecting the polarization intensity of reflected light reflected by the surface of the recording medium, wherein the direction of magnetization in the region of the recording medium to which the metal plate is opposite is detected based on the change in polarization intensity of the reflected light that is attributable to modulation of polarization state of the reflected light, the change in polarization intensity being detected by the detecting means;

wherein the modulating means alternately changes the polarization direction of the incident light to directions having an oblique incident angle $\Phi$ with $0<\Phi \leqq 0.48\pi$ and two symmetric angles $+\theta$ and $-\theta$ with $\pi/4 \leqq \theta \leqq \pi/2$ with respect to a direction perpendicular to the surface of the recording medium; and wherein a difference between squares of an electric field of the reflected light in a direction of the plate is measured.

9. The magnetization detecting apparatus according to claim 8, wherein the recording medium comprises either a multilayer-film structure in which a ferromagnetic layer, a nonmagnetic layer, and a ferromagnetic layer are formed on a substrate or a multilayer-film structure in which an anti-ferromagnetic layer, a ferromagnetic layer, a nonmagnetic layer and a ferromagnetic layer are formed on a substrate.

10. The magnetization detecting apparatus according to claim 8, wherein the magnetic recording layer comprises spatially divided magnetization regions for individual items of information to be recorded.

11. The magnetization detecting apparatus according to claim 8, comprising:

a driving means for rotating the recording medium;

an arm of which one end is rotatably supported and the other end is extended above the recording medium; and a slider provided on the tip portion of the arm, wherein the metal plate is provided on the slider, and wherein the slider is raised due to the rotation of the recording medium whereby a substantially fixed distance is maintained between the metal plate and the recording medium.

12. The magnetization detecting apparatus according to claim 11, wherein the slider comprising a means for guiding light from the light source to the gap in the metal plate and causing it to be incident.

* * * * *